United States Patent
Hebert et al.

[15] 3,663,283
[45] May 16, 1972

[54] PROCESS AND APPARATUS FOR THE PRODUCTION OF FINELY-DIVIDED METAL OXIDES

[72] Inventors: Richard A. Hebert, 14 Belmont Drive, Chelmsford, Mass. 01824; Daniel J. Moynihan, 19 Union St., Watertown, Mass. 02172; Donald E. Paul, Davidson Road, Boxboro, Acton, Mass.; Louis J. Petrovic, 7 Captain Parker Arms, Lexington, Mass. 02173; Peter A. Rubel, Annursnac Hill Road, Concord, Mass. 01742; Ralph Seferian, 335 Highland Ave., Winchester, Mass. 01890

[22] Filed: Oct. 2, 1969

[21] Appl. No.: 863,146

[52] U.S. Cl. ............................106/288, 106/299, 106/300, 23/21, 23/140, 23/142, 23/182 V, 23/202 V, 23/144, 23/145, 23/200
[51] Int. Cl. .................................................C08h 17/04
[58] Field of Search ..............23/140, 142, 182 V, 202 V, 23/21; 106/288, 299, 300

[56] References Cited

UNITED STATES PATENTS 2,791,490    5/1957    Willcox...........................23/202 V

FOREIGN PATENTS OR APPLICATIONS 1,047,713    11/1966    Great Britain......................23/202 V
6,807,718    12/1968    Netherlands.......................23/202 V

*Primary Examiner*—Herbert T. Carter
*Attorney*—Kenneth W. Brown, Arthur S. Collins, Barry R. Blaker and Lawrence H. Chaletsky

[57] ABSTRACT

There is provided an improved process and apparatus for the production of finely-divided metal and metalloid oxides. The invention is generally characterized by the injection of a vaporized metal halide feedstock through a plurality of circumferential orifices and substantially perpendicularly into a plug flow stream comprising heated oxidant gas. Additionally, thin sheeted streams of a purge gas are directed into said oxidant gas stream at loci positioned substantially immediately above and below the locus of the metal halide vapor injection.

22 Claims, 1 Drawing Figure

PATENTED MAY 16 1972
3,663,283
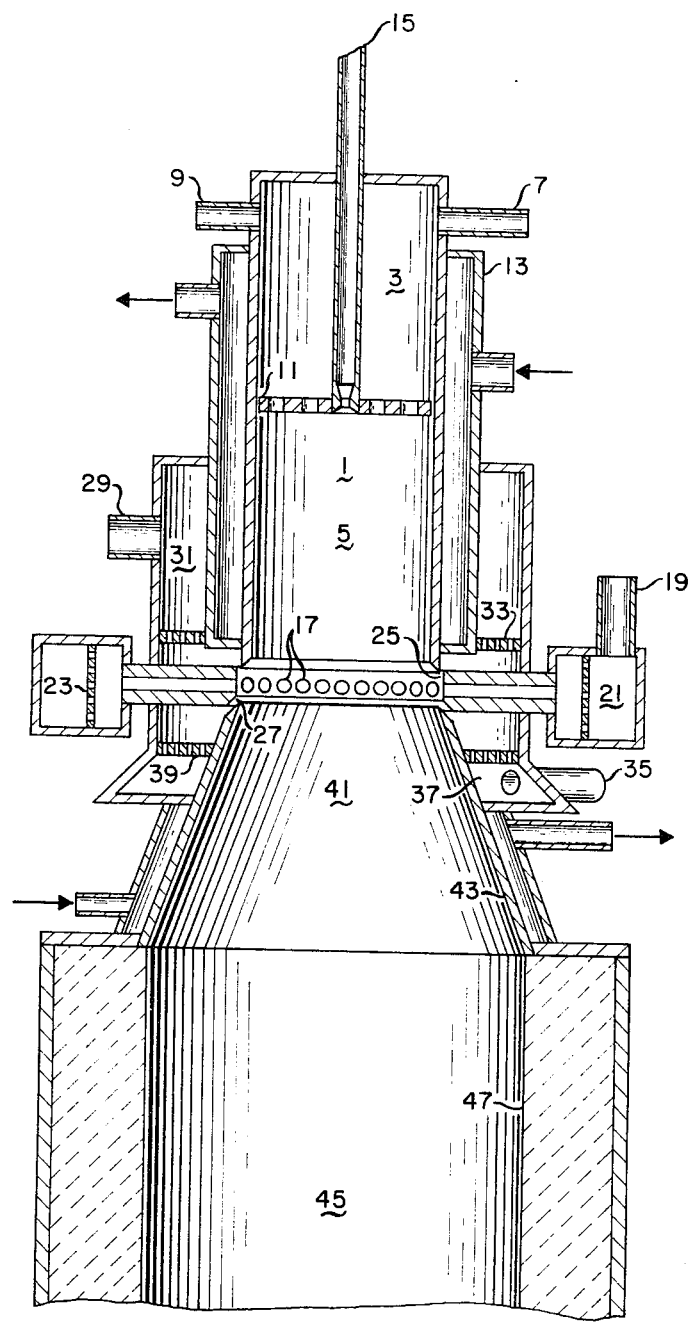

PROCESS AND APPARATUS FOR THE PRODUCTION OF FINELY-DIVIDED METAL OXIDES

THE PRIOR ART

The production of finely divided metal oxides by vapor phase oxidation at high temperatures of corresponding metal halides is well-known. In the broadest sense, such processes require that a metal halide vapor be contacted with a heated gaseous oxidant at temperatures which foster reaction therebetween. Thus, vaporizable metal halides, such as aluminum trichloride, titanium tetrachloride, zirconium tetrabromide, antimony trichloride, chromyl chloride, stannic bromide, ferric chloride, silicon tetrachloride, methyl trichlorosilane, titanium tetrabromide and the like may be oxidized in the vapor phase at temperatures generally above about 800° C. to form finely divided oxide products. In this context, it is to be understood that silicon, while not strictly speaking a metal, is specifically intended to be included within the scope of the term "metal" for the purposes of the instant disclosure.

Today, one of the leading metal oxide products of commerce is titanium dioxide pigment produced by vapor phase oxidation of a titanium tetrahalide, particularly the tetrachloride. Such vapor phase titania pigments are generally considered by those skilled in the pigment art as superior to even the best of those titania pigments produced by older so-called "sulfate" processes involving precipitation of titanium hydroxide from solution followed by calcination thereof to the dioxide. Indeed, vapor phase oxidation titania is generally considered as the ultimate in currently available white opacifying pigments. Accordingly, much research and development activity has been and is presently being directed towards improvements in processes and apparatus by which to carry out titanium dioxide pigment production by the vapor phase oxidation route.

It is further generally recognized that the vapor phase oxidation of metal halides in general and titanium tetrahalides in particular has several problems associated therewith. Firstly, pigment grade metal oxides, and titanium dioxide in particular, are sticky powders which tend to cling with tenacity to solid surfaces. Said tendency manifests itself deleteriously during the vapor phase oxidative production thereof by the formation of adherent coatings, crusts and the like on the producing burner apparatus. Thus, even though many of the prior art vapor phase oxidation burner apparatuses may undergo successful start-up with good initial product quality, continuous operations generally leads to substantial pigment accretion on the surfaces thereof and usually further results in substantial degradation in both the quality of product and ease of operation. Secondly, it is known that the pigmentary properties of a finely divided metal oxide pigment are very heavily dependent upon several physical parameters thereof including morphology, mean particle diameter and particle size distribution.

With respect to particle morphology, it is known that certain prior art processes tend to lead to metal oxide product having substantial populations of non-spherical shaped particles. The angles and corners of such non-spherical particles are extremely deleterious to the optical properties of the overall product. Conversely, of course, finely divided metal oxide pigments having relatively few non-spherical particles forming part of the overall population are therefore highly desirable.

The optimum mean particle diameter of a pigmentary metal oxide can vary substantially depending primarily upon the particular metal oxide in question. For titanium dioxide pigments, for example, it has been determined that the desirable mean particle diameter will generally reside between about 150 and about 300 mμ and preferably between about 160 and about 250 mμ. Said parameter may be determined by electron micrographic analysis and particle count of a sample pigment. Equation 1, following may be suitably employed:

EQUATION 1

$$\ln D_g = \frac{\sum_{i=1}^{Q} \ln D_i}{Q}$$

wherein $D_g$ is the mean particle diameter and Q represents the number of particles sampled.

Of equivalent or even greater importance than either of the two parameters discussed above is the particle size distribution of a metal oxide pigment. As with mean particle diameter determinations, the particle size distribution, $\sigma$, of a pigment sample may also be determined by virtue of electron micrographic examination. Equation 2 describes the appropriate mathematical relationships:

EQUATION 2

$$\sigma = \sqrt{\frac{\sum_{i=1}^{Q} (\ln D_i - \ln D_g)^2}{Q-1}}$$

Obviously, in view of Equation 2, the smaller the sigma, $\sigma$, the narrower will be the particle size distribution of the pigment sample. For titanium dioxide pigments $\sigma$ values of greater than about 0.40 are generally considered as excessive for good optical performance. Values of between about 0.38 and 0.40 constitute a commercially acceptable range of particle size distributions while $\sigma$ values of less than about 0.38 are representative of outstandingly narrow titania pigment particle size distributions. Prior art processes and apparatus have been generally found to be extremely difficult if not impossible to operate commercially so as to produce the optimum combination of narrow particle size distribution product having suitable mean particle diameter and morphology unless further, often stringent, remedial measures are additionally taken. Several of these remedial measures will be discussed in more detail hereinafter.

In U.S. Pat. No. 2,791,490, May 7, 1957 to O.B. Willcox, there is disclosed a method for mixing reactants which, at the time of issue, represented a major breakthrough in process design for vapor phase titanium dioxide pigment production. Basically, there is disclosed in said patent (1) a critical stream geometry relationship in the mixing of the oxidant gas reactant with the vaporized metal halide reactant and (2) a critical range of residence or reaction times. Accordingly, while one of the reactant vapors flows through an enclosed zone, the other reactant vapor is injected at an angle thereinto as a thin sheeted stream from about the periphery of the enclosed zone. Additionally, the reaction time between the thusly mixed reactants is established critically between 0.05 and 5 seconds. While the pigment quality initially arising as a result of the use of the Willcox process can be excellent, said process nevertheless often results in substantial product fouling or accretion of the producing mixing apparatus during continuous operations. Accordingly the hereinbefore described product quality degradation problem normally remains attendent therewith.

In British Pat. Nos. 1,047,713 and 1,047,714, each to Mas et al., there are disclosed a process and apparatus for vapor phase oxidation of metal halides wherein a relatively cool metal halide/oxygen mixture is injected radially through a plurality of circumferential orifices into a rectilinearly moving stream of hot combustion product gases. Unfortunately, however, while mixing of the metal halide and oxidant is obviously inherently excellent due to their mixture prior to injection into the hot combustion product stream, the disclosed apparatus also tends to be subject to solid product fouling thereon. Moreover, the time/temperature relationships necessarily established in bringing the relatively cool premixed metal halide/oxygen reactant mixture to reaction temperature are not conducive to the production of quality pigment on a commercial scale.

In Belgian Patent No. 715,839, published Oct. 16, 1968, there is disclosed a process and apparatus somewhat similar to that disclosed in the aforementioned British patents. Accordingly, titanium tetrachloride vapors are injected, through a plurality of orifices, perpendicularly into a flowing hot combustion product stream containing the required oxidant gases therefor. Additionally, a purge gas is tangentially charged into said combustion product stream through tangential inlets located slightly above and below the plane of introduction of the titanium tetrachloride vapors. While the disclosed apparatus and process partially alleviates the accretion phenomenon, said problem, as well as product property problems, nevertheless persist. The tangential injection of the gas tends to spin the reactant streams and thereby stabilize the resulting reaction flame. However, despite an outward appearance of smooth flow geometry, such spin stabilized flame reactions normally continue to bear substantial internal recirculation patterns therein, thus fostering the solid product accretion phenomenon as well as subjecting a substantial portion of the pigment product to excessively lengthy residence times. Secondly, the tangential inlet of the purge gas also tends to cause substantial turbulent mixing of the purge gas with the reactant gases, thus resulting in normally undesirably excessive dilution of the reactant streams. Thus, while the process of this Belgian patent provides some improvement in the accretion problem it nevertheless fails to fully overcome the deficiencies of the prior art processes.

In its attempts to produce titanium dioxide pigments which realize their theoretically available optical potential, the prior art has generally also resorted to the use of various adjuvants which, when present in the oxidation zone, aid in the nucleation, particle size control and/or rutilization of the forming titania pigments as well as controlling the morphology of the freshly formed pigment particles. The use of said adjuvants, while presently widely commercially practiced and certainly of great aid has, nevertheless, constituted only a partial answer to the inherent deficiencies encountered in prior art oxidation processes. Thus, in U.S. Pat. No. 2,559,638, July 10, 1951, to Krchma et al., there is disclosed a method for producing vapor phase oxidized titania pigments which entails the affirmative steps of providing relatively minute amounts of water and aluminum chloride vapors in the oxidation zone. In U.S. Pat. Nos. 2,488,439 and 2,488,440 water or water forming substances are disclosed as useful in promoting nucleation of the forming titanium dioxide in the oxidation zone. In U.S. Pat. No. 3,208,866 there is disclosed a nucleating process which greatly reduces the tendency of the forming titanium particles to clump together, thereby forming oversize, non-spherical agglomerates. Said process comprises the injection of minor amounts of water vapor and an alkali metal source in the oxidation zone. In particular, potassium represents the preferred alkali metal employed. In U.S. Pat. No. 3,424,799 to Wilson, the beneficial product effects resulting from the conjoint use of silicon and an alkali metal in the titania forming zone are disclosed. In U.S. Pat. No. 3,455,653, to Aftandilian, rare earth metal adjuvants are disclosed as useful in upgrading the titania pigment products of the vapor phase oxidation process.

As mentioned before, each of the above processes, while striking forwards toward the goals of improved product properties and ease of operations nevertheless can also be fairly viewed as remedial partial measures taken in view of the recalcitrant deficiencies of the various basic art known oxidation processes. Of equal importance, each of these so-called "adjuvant" improvements requires the provision of substantial additional equipment, operations, complexity and expense. In particular, aluminum chloride adjuvant injection has been a particularly burdensome process to practice in the vapor phase oxidation of titanium tetrachloride because (1) aluminum chloride vapors are extremely corrosive and (2) aluminum trichloride vapors are difficult to convey, control and meter accurately.

In view of all of the above, therefore, it is obvious that any basic alterations of the vaporized metal halide oxidation process which can (1) avoid deleterious product accretion on the producing apparatus for lengthy continuous periods of operation, (2) result in production of finely divided metal oxide products having narrow particle size distribution, spherical morphology, and proper mean particle diameter, and (3) avoid the necessity for the provision of adjuvant additions in order to achieve (2) would constitute a most significant advance in the art. Happily, it can now be stated that this basic advance has been provided in light of the present invention.

OBJECTS OF THE INVENTION

It is a principal object of the invention to provide an improved process for the production of finely divided metal oxides by high temperature oxidation of metal halides.

It is another object of the invention to provide a novel process for producing metal oxide pigments by high temperature oxidation of metal halide vapors which process is characterized by substantial freedom from accretion of the metal oxide pigment product on the producing apparatus.

It is another object of the invention to provide an improved process for the production of titanium dioxide pigment by high temperature oxidation of titanium tetrahalide vapors.

It is yet another object of the invention to provide a novel process for the production of metal oxide pigments by vapor phase oxidation of corresponding metal halides wherein the product pigment is characterized, in part, by its desirably narrow particle size distribution.

It is still another object of the invention to provide a novel process for the production of titanium dioxide pigments by vapor phase oxidation of titanium tetrahalide wherein the product pigments possess quality optical properties without the necessity for providing adjuvants in the pigment forming zone.

It is another object of the invention to provide novel apparatus for the production of finely divided metal oxides by vapor phase oxidation of corresponding metal halides, said apparatus being characterized by its substantial resistance to solid product fouling thereon.

Other objects and advantages of the instant invention will in part be obvious and will in part appear hereinafter.

THE DRAWING

The drawing forming part hereof is a longitudinal sectional schematic view of one embodiment of suitable burner apparatus bearing the several features of the invention.

GENERAL DESCRIPTION OF THE INVENTION

In accordance with the present invention it has been discovered that the above and other objects are achieved when there is employed burner apparatus comprising (1) a conduit means wherein a suitably heated oxidant containing gas is established in plug flow, and (2) a metal halide feedstock injection zone substantially contiguous with said conduit means and comprising (a) a plurality of orifices positioned circumferentially about the periphery of said injection zone and adapted to inject metal halide vapors substantially perpendicularly into the flowing oxidant gas, and (b) circumferential slot means positioned substantially immediately upstream and downstream from said plurality of peripheral orifices through which slot means there are charged thin sheeted streams of a purge gas.

DETAILED DESCRIPTION OF THE INVENTION

Referring now to the drawing conduit 1 generally comprises mixing zone 3 and combustion zone 5. In one embodiment of the process, a fuel gas, such as CO, and an oxygen containing gas, such as oxygen, are introduced into mixing zone 3 through feed conduits 7 and 9 respectively. If desired, said fuel and oxygen containing gases may be premixed and introduced into said zone 3 through a single such feed conduit. Additionally, inert diluent gases, such as $CO_2$ or $N_2$ may be employed to modify or control the subsequent combustion reaction. As will be explained in more detail hereinafter, the oxygen-containing gas introduced into mixing zone 3 through conduit 9 will generally contain sufficient oxygen not only to substantially completely burn the fuel gas, but also to provide the entire oxygen concentration required for the oxidation of the metal halide feedstock.

In any case, the combustible fuel/oxygen containing It mixture formed in said zone 3 passes through flame holder 11 and into combustion zone 5 wherein ignition and combustion thereof takes place. The provision of flame holder 11, which may conveniently comprise a perforated plate across conduit 1, is highly desirable in terms of combustion stability and protection of equipment upstream therefrom. The volume and particular geometry of combustion zone 5 are such as to provide a hot combustion product gas efflux which moves in so-called "plug" flow. It is all important to the success of the process and apparatus of the invention that the injection of the metal halide feedstock and thin slotted streams of purge gas into the oxidant gas take place only when said "plug" flow of said hot oxidant has been achieved. As will be recognized by those skilled in the art, "plug" flow may be simply defined as a moving volume of gas having a substantially flat velocity profile across the cross-section thereof. In other words, the velocity of gas moving through any given point in the cross-section of a plug flow stream is substantially equal to the velocity taken at any other point or points in said cross-section. For the purpose of the present invention, therefore, "plug" flow is achieved when there is no more than about a ± 30 percent velocity differential between any two points in the cross-section of the flowing oxidant gases (excepting, of course, at the boundaries thereof whereat the velocity will often necessarily decrease rapidly due to boundary layer effect 3).

Additionally, with respect to apparatus design and operations of combustion chamber 1, it is highly desirable that cooling of at least combustion zone 5 be accomplished, such as by means of liquid coolant jacket 13. Also, a convenient means for injecting adjuvants or diluents, if desired, can be provided by axial injection probe 15 extending through mixing zone 3 and flame holder 11 and in open communication with combustion zone 5.

It should be further carefully noted that the process of the present invention is not contemplated as being restricted to provision of the hot oxidant gas stream specifically by way of an auxiliary combustion reaction. For instance, the oxidant gas may be heated by direct or indirect heat exchange, resistance heating, electric arc or induction plasma if desired and thereafter passed through conduit 1 in order to achieve the necessary plug flow character thereof. Accordingly, it is the principal purpose of conduit 1 to establish the necessary plug flow of the oxidant gas stream; the particular mode of heating of said oxidant stream is not generally critical provided that sufficient heat is imparted thereto to foster reaction thereof with the metal halide vapors subsequently injected thereinto.

Having provided a plug flow stream of hot oxidant gases containing substantially the entire load of oxygen required to oxidize the metal halide feedstock, said feedstock, in vapor form, is injected radially inwardly through a plurality of orifices 17 positioned substantially equiangularly about the circumference of said oxidant gas stream. At least two and preferably more than four such orifices 17 are provided. While only a single plane or row of such orifices 17 are shown in the drawing, it will be obvious that more than one row thereof may be employed provided, of course, that said rows or planes follow one another substantially immediately. The metal halide vapors may be supplied to said orifices 17 by charging thereof through conduit 19 into plenum 21. Plenum 21 is preferably provided with distribution plate 23 in order to ensure uniform supply of the metal halide vapors to each of said orifices 17. The angle of injection of the metal halide vapors through said orifices 17 should be substantially perpendicular (± 45°) to the axis of the flowing oxidant gas stream. The metal halide vapors may, if desired, be diluted or conveyed with inerts such as nitrogen, argon, $CO_2$, recycled off-gases, etc., or may contain minor amounts of adjuvants such as previously mentioned, e.g. aluminum chloride, silicon tetrachloride, etc.

Equation 3, following, represents a suitable design equation for properly selecting the apparatus orifice design parameters:

EQUATION 3

$$ND_H^2 = \frac{\rho H V_H}{\sigma R V_R} \times \frac{1}{RATIO} < D_R^2$$

where

N = number of orifices
$D_H$ = diameter of orifices (inches)
$D_R$ = diameter across oxidant-containing gas stream enclosure taken at level of orifices (inches)
$\rho H$ = density of metal halide containing gases injected through orifices (lbs./ft.$^3$)
$\rho R$ = density of oxidant containing gases (lbs./ft.$^3$)
$V_H$ = volume flow rate of metal halide containing gases through orifices (ft.$^3$/hr.)
$V_R$ = volume flow rate of oxidant containing gases (ft.$^3$/hr.)

$$RATIO = \frac{\text{mass velocity of metal halide containing gases injected through orifices (lbs./hr. ft.}^2\text{)}}{\text{mass velocity of oxidant containing gases (lbs./hr. ft.}^2\text{)}}$$

Generally speaking, in order to obtain pigmentary metal oxide products of suitable mean particle diameter and particle size distribution, the RATIO expressed above should be maintained at between about 5 to about 50 and desirably should be chosen so as to provide a RATIO of between 10 and about 20.

With respect to the above Equation 3 and the discussion relating thereto it should be noted that the orifices and oxidant gas stream enclosure are considered as substantially circular in cross-sections and, indeed, orifices and oxidant gas stream enclosures of circular cross-sections are generally preferred due to considerations of manufacturing ease. However, it should be borne in mind that orifices and/or oxidant gas stream enclosures having cross-sections other than circular are also contemplated as useful in the apparatus and process of the invention. Accordingly, square, rectangular, ovoid, etc. orifice cross-sections are also suitable. When non-circular geometries are to be employed, Equation 3 can obviously be converted to recite cross-sectional areas rather than diameters.

Another important aspect of the invention resides in the injection of separate streams of a purge gas, as thin non-spinning sheets, into the oxidant gas stream from loci substantially immediately above and below the locus of injection of the metal halide feedstock. Accordingly, there are provided peripheral slots 25 and 27 positioned above and below orifices 17. Each of said slots 25 and 27 subtends substantially the entire circumference of the apparatus. While the purge gas may be supplied to said slots 25 and 27 from a single plenum or manifold said supply will preferably be separate for each slot in the interests of operational ease and control. Accordingly, in the drawing, slot 25 is supplied with purge gas charged through conduit 29 into plenum 31. The resident gas in plenum 31 flows through distributor plate 33 and thence through slot 25. Likewise, slot 27 is supplied through conduit 35, plenum 37 and distributor plate 39.

The directions imparted to each of the respective sheeted purge gas streams is subject to wide variation. Accordingly, the purge gas injected through upstream slot 25 may be projected through a range of from about 60° countercurrent to the flow of oxidant gases to substantially parallel and cocurrent therewith (180°), this latter preferred mode being shown in the drawing. Downstream slot 27 may project the purge gas through substantially the entire 0°–180° range with respect to the direction of the oxidant gas flow, although a projection range of from about perpendicular (90°) to about 20° countercurrent with respect to said oxidant flow will generally be preferred. When the purge gases are directed at an angle countercurrent the flow of oxidant gas from downstream slot 27, it will be apparent that (1) construction of the apparatus is generally simplified by such design, and (2) the efflux of the so-angled purge gas slot tends to emanate more closely to the downstream portions of orifices 17 which also is generally highly desirable.

Purge gases suitable for use in the practice of the invention are generally any gaseous substance which does not react deleteriously with either the reactant streams or metal oxide reaction products. Accordingly, any of the noble gases will normally be universally suitable for use in the present invention. However, economics will generally dictate that purge gases which are both relatively inexpensive, and conveniently available on site be employed. Thus, carbon dioxide, nitrogen, carbon monoxide, halogen or recycled reaction zone off-gases, or mixtures thereof will normally be preferred. When a halogen gas is employed, it is obviously desirable that said halogen be of the same specie as that forming part of the metal halide feedstock. Further, it is desirable that the particular purge gas employed have a relatively high heat capacity. In this context, while the temperature of the purge gas injected into the oxidant stream is normally not critical, due consideration of minimum reaction zone dilution and maximum protection from fouling provides that it is highly desirable that the purge gas be injected at relatively low temperature, e.g. at from about 10° C. to about 50° C. Further, as will be apparent from the design equation presented hereinafter, the cooler the purge gas, all other factors being equal, the greater will be its density. Thus, the cooler a given purge gas at the time of injection thereof through the slots, the narrower can be the widths of said slots.

The design criteria of each of the purge gas slot means associated with the apparatus of the invention can be best summarized by reference to Equation 4 below:

EQUATION 4

$$H_p = \frac{M_{pg}}{M_{mh}} \times \frac{1}{MOV\ RATIO} \times \frac{ND_H}{4D_R}$$

wherein $H_p$ = slot width (inches)
$M_{pg}$ = molar purge gas rate (lb. moles/hr.)
$M_{mh}$ = molar gas rate through orifices (lb. moles/hr.)
$D_H$ = diameter of feedstock injection orifices (inches) (see Eq. 3)
$N$ = number of feedstock injection orifices
$D_R$ = diameter across oxidant containing gas stream taken at level of orifices (inches) (see Eq. 3)

$$MOV\ RATIO = \frac{molar\ velocity,\ purge\ gas\ (lbs.\ moles/hr.\ ft.^2)}{molar\ velocity,\ gases\ through\ orifices\ (lbs.\ moles/hr.\ ft.^2)}$$

With respect to the MOV RATIO, above, it is to be noted that said ratio will be different for operation of each of the two slots. Accordingly, for slot 25, upstream from the injection locus of the vaporized metal halide feedstock, said ratio will be maintained at between about 0.4 to about 1.0 while the ratio for slot 27, positioned downstream from said locus, will be maintained at between about 1.0 and about 5.0. Preferably, the MOV RATIO for the respective slots will be maintained at between about 0.43 and 1.0 for upper slot 25 and between about 1.0 to about 1.5 for lower slot 27. Failure to adhere to these criteria can result in apparatus fouling and/or substantial loss of product quality.

In producing the apparatus or effecting the process of the invention, Equations 3 and 4 above should be carefully borne in mind and alteration of any of the process stream flows or apparatus geometry should not normally result in deviations of more than about 45 percent from those derivable in said equations. Preferably, the process and the particular apparatus design employed will be maintained within about 15 percent of these design equations.

Subsequent to the injection of purge gas through bottom slot 27, the resulting gaseous reaction mixture stream comprising the oxidant, purge gases, vaporous metal halide feedstock, diluents, combustion products, and the like is then fired into a suitable enclosed reaction space wherein conversion of the metal halide to the corresponding oxide is completed. The particular design of said reaction space is not critical to the operability of the invention provided that said design avoids recirculation of the reactant gas mixture into throat 41 of the apparatus. Accordingly, said reaction space enclosure may simply constitute a tubular heat resistant structure coextensive with and of equal diameter to the burner apparatus or, alternatively, as shown, be constituted by a tapered transition piece 43 opening outwardly from the base of the mixing apparatus into a reaction chamber 45 of greater internal diameter than that of the burner apparatus. In this manner, the resulting reaction flame does not normally contact the reaction chamber wall 47 and thus tends to obviate the potential for substantial solid product accretion thereon.

For the purposes of the present invention, the term "residence time" refers to the time interval occuring between the injection of the vaporous metal halide feedstock and the cooling of the resulting reaction mixture to below the oxidation reaction temperature(s). Generally speaking, said residence time should not exceed about 10 seconds. However, in most instances, particularly with respect to pigment production, the residence time will desirably be held to less than about 0.75 second and often to even less than about 0.05 second. Also, it is much preferred that the reaction be quenched quickly to below oxidation reaction temperature rather than by allowing the reaction to decay relatively slowly by natural heat losses to the environment. Accordingly, it is desirable that means be provided to accomplish said quenching function such as can be conveniently provided by injecting cool inert gases into the reaction mixture. A convenient suitable gas for such purposes is recycled off-gas which has previously had removed therefrom the metal oxide product solid burden and which has been substantially cooled. Obviously, however, other gases may be employed provided, of course, that said gases do not react deleteriously with the solid reaction product or with the vaporous reaction by-products desired to be recovered in substantially unaltered condition. For instance, the halogen by-product of the oxidation reaction is often recovered for reuse in halogenating metal bearing ore, etc. Accordingly, the use of a quench gas which would tend to react substantially with such halogen by-product is normally contraindicated.

While the above description and discussion has related the process and apparatus of the invention to the production of metal oxide pigments in general, it will be appreciated that both the process and apparatus are particularly well suited for the production of titanium dioxide pigments by oxidative conversion of titanium tetrachloride.

In a preferred embodiment of the titanium dioxide process of the invention the oxidant gas is heated by means of an auxiliary combustion reaction carried out therewith. reaction by dilution thereof with an inert gas, particularly carbon dioxide. It is also known that stable combustion of carbon monoxide is difficult to achieve unless a trace amount of hydrogen or water is present in the combustion zone. Accordingly, in the practice of the preferred titanium dioxide pigment producing oxidation process of the instant process adherence to the independent process variables of Table I, following, is important.

TABLE I

| Parameter | Absolute Range | Preferred Range |
|---|---|---|
| | Temperature | |
| $TiCl_4$ feedstock vapor temp. | 350°F-dissociation temp. | 500°F-600°F |
| | Mole Ratios | |
| $CO/TiCl_4$ | 0.5-1.8 | 0.6-1.0 |

|  |  |  |
|---|---|---|
| $CO_2/TiCl_4$ | 0.0–1.0 | 0.4–0.6 |
| Oxidant $O_2/TiCl_4$ (exclusive of fuel gas oxidant) | 1.0–2.6 | 1.2–1.6 |
|  | Wt on $TiO_2$ |  |
| $H_2$ | 0.00–0.05% | 0.01–0.02% |
| Aluminum | 0.00–no definable upper limit % | 0.00–3.00% |
| Silicon | 0.00–no definable upper limit % | 0.00–0.05% |
| Alkali metal | 0.00–10,000 p.p.m. | 0.00–5,000 p.p.m. |

As will be recognized, the above Table I provides for the inclusion of various adjuvant materials as mentioned hereinbefore. While the provision of such adjuvants will generally not be required in the process of the invention in order to result in pigment products of quality optical properties, contemplation of the use thereof is, of course, not excluded. For instance, certain of the adjuvants known to the prior art also impart properties not necessarily optically oriented, such as ultraviolet resistance, antichalking, etc.

There follow a number of non-limiting Examples:

EXAMPLE 1

A water cooled Inconel (a nickel-chromium alloy produced by The International Nickel Co., Inc., Huntington, W. Va.) burner apparatus of the type shown in the drawing and described in detail hereinbefore is employed. Conduit 1 has a length of 9.00 inches and a bore diameter (°$D_r$) of 4 inches. Flameholder 11, comprising a 1.00 inch thick inconel disc having 50 0.125-inch perforations therethrough is positioned midway along the length of said conduit 1. Immediately downstream from said conduit 1 and coaxial therewith the feedstock injection zone comprises thirty circular orifices 17 each of 0.255-inch diameter positioned radially and equiangularly about the circumference of the zone enclosure, all of the orifices 17 are directed substantially perpendicularly to the axis of conduit 1. Provided above and below the plane described by said orifices 17 are circumferential slots 25 and 27 each slot having a width of 0.0625 inch. The distance, center to center, between orifices 17 and slots 25 and 27, respectively, is, in each instance, 0.25 inch. Immediately downstream from slot 27, the bore of the apparatus is flared by transition piece 43 to a 6-inch i.d. which, in turn, is attached coextensively to a ceramic reaction chamber 45 having an i.d. of 6 inches and a length of about 9 ft. The hot efflux from the base of the reaction chamber is first conducted into a "T" whereat cooled off-gases are mixed therewith in order to quickly quench the reaction. Said off-gases are charged at rates of between about 15,000 and about 30,000 SCFH, depending upon the particular run conditions. The reaction products formed during the metal oxide producing runs and the quench gases are then conducted into suitable indirect heat exchange and collection apparatus.

A series of runs are made utilizing titanium tetrachloride as the metal halide feedstock, oxygen as the fuel gas and metal halide oxidant, carbon monoxide as the fuel gas and carbon dioxide as the diluent modifier for the combustion reaction. In each run, the titanium tetrachloride was vaporized and conducted into the apparatus at 550° F. Additionally, several of the runs included the addition of various adjuvants into the reaction mixture. Potassium was added through probe 15 as a 10 percent aqueous solution of potassium acetate in a solvent consisting of a 1:1 ethylene glycol water mixture. Aluminum trichloride and silicon tetrachloride adjuvants were first sublimed or vaporized and then premixed with the vaporous titanium tetrachloride feedstock stream prior to entry of the vapor feedstock into plenum 21.

Table II following provides a list of the process variables employed as well as the quality of operations resulting therefrom. In Runs 2 and 3 where, in each case, one of the slotted purge gas streams is in disuse, the apparatus is modified by insertion of a ring-shaped metal blank in the appropriate purge gas slot(s). Said blanks are shaped so as to

TABLE II

| Run No. | $TiCl_4$ rate moles/hr. | CO rate moles/hr. | $CO/TiCl_4$ mole ratio | $CO_2$ rate moles/hr. | $CO_2/TiCl_4$ mole ratio | Total $O_2$ rate moles/hr. | $TiCl_4$ oxidant $O_2/TiCl_4$ mole ratio | Ratio (Eq. 3) |
|---|---|---|---|---|---|---|---|---|
| 1 | 3.0 | 2.1 | 0.7 | 1.3 | 0.42 | 5.15 | 1.6 | 15.3 |
| 2 | 3.0 | 2.1 | 0.7 | 1.3 | 0.42 | 5.15 | 1.6 | 15.3 |
| 3 | 3.0 | 2.1 | 0.7 | 1.3 | 0.42 | 5.15 | 1.6 | 15.3 |
| 4 | 3.0 | 2.1 | 0.7 | 1.3 | 0.42 | 5.15 | 1.6 | 15.3 |
| 5 | 3.0 | 2.1 | 0.7 | 1.3 | 0.42 | 5.15 | 1.6 | 15.3 |
| 6 | 3.0 | 2.1 | 0.7 | 1.3 | 0.42 | 5.15 | 1.6 | 15.3 |
| 7 | 3.0 | 2.1 | 0.7 | 1.3 | 0.42 | 5.15 | 1.6 | 15.3 |
| 8 | 3.0 | 2.1 | 0.7 | 1.3 | 0.42 | 5.15 | 1.6 | 15.3 |
| 9 | 3.0 | 2.1 | 0.7 | 1.3 | 0.42 | 5.15 | 1.6 | 15.3 |
| 10 | 3.0 | 2.1 | 0.7 | 1.3 | 0.42 | 43.8 | 14.6 | 3.0 |
| 11 | 3.0 | 2.1 | 0.7 | 1.3 | 0.42 | 5.15 | 1.6 | 15.3 |

TABLE II—Continued

| Run No. | Purge gas (at 20° C.) | Purge gas rate (drawing) SCFH Slot 25 | Purge gas rate (drawing) SCFH Slot 27 | MOV RATIO (Eq. 4) slot 25 drawing | MOV RATIO (Eq. 4) slot 27 drawing | Adjuvant type/conc. | Run length hrs. | Fouling quality |
|---|---|---|---|---|---|---|---|---|
| 1 | $N_2$ | 195 | 890 | 0.50 | 1.50 | None | 36 | Light dusting. |
| 2 | $N_2$ | 0 | 890 | 0.00 | 1.50 | None | 2 | Heavy sintered fouling above orifices necessitates shutdown. |
| 3 | $N_2$ | 195 | 0 | 0.50 | 0.00 | None | 3 | Heavy sintered fouling below orifices narrows burner I.D.; necessitates shutdown. |
| 4 | $CO_2$ | 195 | 890 | 0.50 | 1.50 | None | 36 | Light dusting. |
| 5 | $N_2$ | 195 | 890 | 0.50 | 1.50 | $AlCl_3$/ 1.5% $Al_2O_3$ | 36 | Light dusting. |
| 6 | $N_2$ | 195 | 890 | 0.50 | 1.50 | $SiCl_4$/(0.1% $SiO_2$) | 36 | Light dusting. |
| 7 | $N_2$ | 195 | 890 | 0.50 | 1.50 | KAC/25 p.p.m | 36 | Light dusting. |
| 8 | $N_2$ | 75 | 890 | 0.13 | 1.50 | None | 4 | Sintered fouling above orifices necessitates shutdown. |
| 9 | $N_2$ | 195 | 450 | 0.50 | 0.75 | None | 8 | Sintered fouling below orifices narrows burner I.D. necessitates shutdown. |
| 10 | $N_2$ | 195 | 890 | 0.50 | 1.50 | None | 36 | Light dusting. |
| 11 | $N_2$ | 195 | 890 | 0.50 | 1.50 | None | 36 | Light dusting. | avoid alteration of the flow of the enclosed gases past the slot(s) blocked thereby.

In each of Runs 1 through 10, residence time is less than about 100 milliseconds. In Run 11, however, the residence time is increased to about 12 seconds by adding a length of insulated conduit between the base of reactor 45 and the quench "T."

Samples of the titanium dioxide product from various of the runs are then each subjected to several analytical tests, the results of which are shown in Table III below.

TABLE III

| Sample run No. | Percent rutile [1] | Percent Y [2] | Surface area (M²/gram)[3] | Particle size distribution (σ) | Mean particle diameter (mμ) |
|---|---|---|---|---|---|
| Control, R – 900 Run (DuPont) | 100.0 | 100.0 | 6.5 | 0.37 | 195 |
| 1 | 100.0 | 100.6 | 6.3 | 0.37 | 193 |
| 2 | 100.0 | 99.4 | 6.8 | 0.38 | 186 |
| 3 | 99.8 | 99.2 | 6.9 | 0.38 | 182 |
| 4 | 100.0 | 100.2 | 6.4 | 0.37 | 192 |
| 5 | 100.0 | 100.0 | 6.5 | 0.38 | 198 |
| 6 | 99.6 | 99.8 | 6.7 | 0.39 | 189 |
| 7 | 100.0 | 100.6 | 6.4 | 0.37 | 197 |
| 8 | 100.0 | 99.1 | 6.9 | 0.39 | 183 |
| 9 | 100.0 | 99.3 | 6.6 | 0.38 | 188 |
| 10 | 90.0 | < 90 | > 20 | 0.49 | < 100 |

[1] Percent rutile is indicative of the extent of formation of titanium dioxide pigment product in its desirable rutile crystal form. Determination made by x-ray analysis of product samples.

[2] Percent Y is a measurement of opacifying power of a sample pigment relative to standard pigment. Said measurement is effected by analysis of the sample with the green wavelength source of a tristimulus colorimeter known as the "Coloreye" manufactured by Instrument Development Laboratories, Inc. of Attleboro, Massachusetts. Operation of said instrument is described in detail in the manufacturer's "Instruction Manual Number 1000 G for Model D Coloreye."

[3] Surface Area is determined by the well-known BET nitrogen absorption technique.

As will be noted from the above data tables, the presence of various of the commonly employed adjuvants of the prior art in the reaction zone does not appear to markedly alter the optical quality of the pigment produced in accordance with the invention. While not fully understood, this demonstrated relative "insensitivity" of the process of our invention to such adjuvant additions is strongly suggestive of the fact that our process may well result in raw pigmentary $TiO_2$ products which approach the theoretical potentials of the titanium tetrachloride vapor phase oxidation process.

EXAMPLE 2

The Example is substantially a duplicate of Run No. 1 of Example 1 with the notable exception that vaporized aluminum trichloride was employed as the metal halide feedstock. Accordingly, aluminum trichloride vapor, heated to about 300° C., is charged into the apparatus at a rate of about 2 moles/hour. The resulting alumina product collected and is found to comprise a finely divided material of narrow particle size distribution, useful as a high temperature refractory.

EXAMPLE 3

This Example is substantially a duplicate of Run No. 1 of Example 1 with the exception that a vaporous mixture of aluminum trichloride and silicon tetrachloride is employed as the metal halide feedstock. Accordingly, aluminum trichloride vapor heated to about 300° C. is charged into an intermediate mixing chamber at a rate of about 2 moles/hour. Silicon tetrachloride is vaporized, heated to about 300° C., and is additionally charged into the mixing chamber at a rate of about 1 mole/hour. The vaporous metal halide mixture is then charged into the metal oxide producing apparatus. The resulting product is collected and found to comprise a finely divided mixed oxide of aluminum and silicon, of narrow particle size distribution, useful as a catalyst support.

EXAMPLE 4

Zirconium tetrachloride is vaporized, charged into the producing apparatus and oxidized in substantially the same manner as described in Example 1, Run No. 1. However, air is substituted for both the oxygen oxidant and carbon dioxide diluent employed in said Example 1. Said air is first passed through molecular sieves in order to dry same and then charged into the producing apparatus at a rate of about 9,500 SCFH/hour. The resulting product is collected and is found to comprise finely divided zirconia of narrow particle size distribution. Operations are conducted over a period of about 24 hours with no deleterious fouling of the producing apparatus.

Obviously many changes can be made in the above description and examples without departing from the intended scope of the invention. For instance, while heating of the oxidant gases in the above examples is accomplished by way of direct heat exchange and the use of an auxiliary heat producing combustion reaction, it is obvious that said oxidant gases can be heated by other suitable methods, such as indirect heat exchange or electrical resistance heating thereof.

Also the metal oxide producible by way of the present invention can be aftertreated in order to better suit them for specific end uses. Titanium dioxide pigments, for instance are often subjected to aftertreatment procedures involving calcination, fluid energy milling, sand milling, elutriation, treatment with surfactants, deposition of relatively minor amounts of alumina, silica or titania thereon from solution, etc.

The metal oxide products of the invention can find many uses other than as opacifying pigments. Accordingly, the metal oxide products of the invention may be employed as ceramic pigments, flame spray coating materials, fillers, extenders, viscosity control agents, free flow agents, insulators, glass batch ingredients, semiconductors, catalysts and catalyst supports, gas adsorption media and the like.

What is claimed is:

1. A process for the production of particulate metal oxides by oxidation at high temperatures of oxidizable halide vapors which comprises:
   a. providing an oxidant gas stream flowing through an enclosed zone, said stream
      i. containing substantially all of the oxidant gas required to oxidize said oxidizable metal halide vapor to the corresponding metal oxide,
      ii. being heated to a temperature sufficient to foster reaction between said oxidant gas and said oxidizable metal halide vapor and to heat the resulting stream of (d) to above about 800° C., and
      iii. being established in plug flow;
   b. injecting said oxidizable metal halide vapor substantially radially and substantially perpendicularly into said plug flow oxidant gas stream from a plurality of orifices positioned substantially equiangularly about the periphery of said enclosed zone;
   c. injecting into said oxidant gas stream from a locus substantially immediately above the locus of injection of said oxidizable metal halide vapors a slotted stream of a substantially inert purge gas, said slotted stream substantially completely and continuously circumscribing said enclosed zone without spinning thereabout; and
   d. injecting into said oxidant/metal halide gas stream from a locus substantially immediately below the locus of injection of said oxidizable metal halide vapors a slotted stream of a substantially inert purge gas, said slotted stream substantially completely and continuously circumscribing said enclosed zone without spinning thereabout;
   e. flowing the resulting stream of (d) into an enclosed reaction space and providing sufficient residence time therein to promote formation of the particulate metal oxide; and
   f. cooling and collecting said metal oxide of (e) as product.

2. The process of claim 1 wherein heating of said oxidant gas stream is accomplished by combustion of a fuel gas with an excess of an oxygen containing gas.

3. The process of claim 2 wherein said oxygen-containing gas is oxygen.

4. The process of claim 2 wherein the oxygen-containing gas is air.

5. The process of claim 2 wherein said fuel gas is carbon monoxide.

6. The process of claim 1 wherein said metal halide is chosen from the group consisting of the vaporizable halides of titanium, zirconium, aluminum, silicon and mixtures thereof.

7. The process of claim 6 wherein said metal halide is titanium tetrachloride.

8. The process of claim 6 wherein said metal halide is aluminum trichloride.

9. The process of claim 6 wherein said metal halide is silicon tetrachloride.

10. The process of claim 1 wherein said metal halide vapors are injected into said enclosed plug flow oxidant gas stream through at least four of said substantially equiangularly, perpendicularly and radially positioned orifices.

11. The process of claim 1 wherein the geometries of the orifices and the cross section of the oxidant gas stream are substantially circular and said metal halide vapors are injected into said oxidant gas stream substantially in accordance with the equation:

$$ND_H^2 = \frac{\rho H V_H}{\rho R V_R} \times \frac{1}{RATIO} \times D_R^2$$

wherein
N = number of orifices
$D_H$ = diameter of orifices (inches)
$D_R$ = diameter across oxidant-containing gas stream enclosure taken at level of orifices (inches)
$\rho H$ = density of metal halide containing gases injected through orifices (lbs./ft.$^3$)
$\rho R$ = density of oxidant containing gases (lbs./ft.$^3$)
$V_H$ = volume flow rate of metal halide containing gases through orifices (ft.$^3$/hr.)
$V_R$ = volume flow rate of oxidant containing gases (ft.$^3$/hr.)

$$RATIO = \frac{\text{mass velocity of metal halide containing gases injected through orifices (lbs./hr. Ft.}^2\text{)}}{\text{mass velocity of oxidant containing gases (lbs./hr. ft.}^2\text{)}}$$

and wherein said RATIO is maintained at between about 5 and about 50.

12. The process of claim 11 wherein said RATIO is maintained at between about 10 and about 20.

13. The process of claim 1 wherein said slotted purge gas stream injected in (c) is directed into said oxidant gas stream at an angle of between about 60° upwardly to about 180° downwardly with respect to the direction of flow of said oxidant gas stream.

14. The process of claim 1 wherein said slotted purge gas stream injected in (d) is directed into said oxidant gas/metal halide vapor stream at an angle of between about 0° upwardly to about 180° downwardly with respect to the direction of flow of said oxidant gas/metal halide vapor stream.

15. The process of claim 14 wherein said slotted purge gas stream is injected at an angle of between about 90° to about 20° upwardly with respect to the direction of flow of said oxidant gas/metal halide vapor stream.

16. The process of claim 1 wherein said inert purge gas is carbon dioxide; nitrogen; carbon monoxide; a halogen; recycled, cooled and filtered off-gas or mixtures thereof.

17. The process of claim 1 wherein said inert purge gas is injected in steps (c) and (d) at temperatures of between about 10° C. and about 50° C.

18. The process of claim 1 wherein each of said slotted purge gas streams of steps (c) and (d) is operated substantially in accordance with the equation $$H_p = \frac{M_{pg}}{M_{mh}} \times \frac{1}{MOV\ RATIO} \times \frac{ND_H}{4D_R}$$

wherein
$H_p$ = slot width (inches)
$M_{pg}$ = molar purge gas rate (lb. moles/hr.)
$M_{mh}$ = molar gas rate through orifices (lb. moles/hr.)
$D_H$ = diameter of feedstock injection orifices (inches)
N = number of feedstock injection orifices
$D_R$ = diameter across oxidant containing gas stream taken at level of orifices (inches)

$$MOV\ RATIO = \frac{\text{molar velocity, purge gas (lbs. moles/hr. ft}^2\text{)}}{\text{molar velocity, gases through orifices (lbs. moles/hr. ft.}^2\text{)}}$$

19. The process of claim 18 wherein in step (c) the MOV RATIO is maintained at between about 0.4 and about 1.0 and, in step (d), the MOV RATIO is maintained at between about 1.0 and about 5.0.

20. The process of claim 18 wherein in step (c) the MOV RATIO is maintained at between about 0.43 and about 1.0 and, in step (d) the MOV RATIO is maintained at between about 1.0 and about 1.5

21. The process of claim 1 wherein (a) titanium tetrachloride is the vaporous metal halide feedstock; (b) the oxidant gas stream is formed by a combustion reaction employing carbon monoxide as the fuel; (c) oxygen is the oxidant for both the carbon monoxide and the titanium tetrachloride feedstock; (d) carbon dioxide is employed as a combustion reaction modifier; and wherein molar ratios are maintained as follows:

| | |
|---|---|
| $CO/TiCl_4$, | about 0.5 to about 1.8 |
| $CO_2/TiCl_4$, | about 0.0 to about 1.0 |
| $O_2(TiCl_4)/TiCl_4$, | about 1.0 to about 2.6 |

22. The process of claim 21 wherein said molar ratios are maintained as follows:

| | |
|---|---|
| $CO/TiCl_4$, | about 0.6 to about 1.0 |
| $CO_2/TiCl_4$, | about 0.4 to about 0.6 |
| $O_2(TiCl_4)/TiCl_4$, | about 1.2 to about 1.6 |

* * * * *